(12) United States Patent
Miracle

(10) Patent No.: US 9,243,428 B1
(45) Date of Patent: Jan. 26, 2016

(54) BICYCLE LOCK

(71) Applicant: Darrell Miracle, Cocoa, FL (US)

(72) Inventor: Darrell Miracle, Cocoa, FL (US)

( * ) Notice: Subject to any disclaimer, the term of this patent is extended or adjusted under 35 U.S.C. 154(b) by 0 days.

(21) Appl. No.: 14/569,081

(22) Filed: Dec. 12, 2014

(51) Int. Cl.
| | |
|---|---|
| *E05B 67/06* | (2006.01) |
| *E05B 67/00* | (2006.01) |
| *E05B 71/00* | (2006.01) |
| *E05B 73/00* | (2006.01) |

(52) U.S. Cl.
CPC ............... *E05B 67/003* (2013.01); *E05B 71/00* (2013.01); *E05B 73/0005* (2013.01)

(58) Field of Classification Search
CPC ....... E05B 67/00; E05B 67/003; E05B 67/06; E05B 71/00; E05B 73/00; E05B 73/005; E05B 73/007; E05B 73/0076; E05B 73/0094; E05B 73/0005
See application file for complete search history.

(56) References Cited

U.S. PATENT DOCUMENTS

| | | | | |
|---|---|---|---|---|
| 1,380,719 A | * | 6/1921 | Johnson | ................ E05B 67/003 70/260 |
| 1,394,259 A | | 10/1921 | Johnson | |
| 1,539,301 A | * | 5/1925 | Cooper | ................ E05B 67/003 70/260 |
| 1,545,660 A | | 7/1925 | Johnson | |
| 1,772,453 A | | 8/1930 | Bosworth | |
| 3,590,608 A | | 7/1971 | Smyth | |
| 3,696,647 A | | 10/1972 | Balicki | |
| 3,765,196 A | | 10/1973 | Balicki | |
| 3,933,015 A | * | 1/1976 | Balicki | ................ E05B 67/003 70/18 |
| 4,177,541 A | * | 12/1979 | Seakan | ............... E05B 73/0005 70/18 |
| 4,597,273 A | | 7/1986 | Reichenberger | |
| 4,860,408 A | * | 8/1989 | Johnson | ................ B60P 7/0823 24/122.3 |
| 5,274,353 A | * | 12/1993 | Bianchi | ................. E05B 45/005 340/427 |
| 5,896,762 A | * | 4/1999 | Iidaka | ................... E05B 67/003 109/34 |
| 5,937,678 A | | 8/1999 | Kuo | |
| 6,401,502 B1 | | 6/2002 | Yang | |
| 8,429,940 B2 | * | 4/2013 | Evans | ................... E05B 67/003 70/360 |
| 8,578,743 B2 | | 11/2013 | Yu | |
| 2003/0230123 A1 | * | 12/2003 | Weinraub | .............. E05B 67/003 70/49 |
| 2005/0183475 A1 | * | 8/2005 | Liu | ....................... E05B 67/003 70/49 |
| 2005/0262904 A1 | | 12/2005 | Ling | |
| 2006/0032276 A1 | * | 2/2006 | Early | .................. E05B 73/0005 70/58 |
| 2014/0024247 A1 | | 1/2014 | Riesgaard | |

* cited by examiner

*Primary Examiner* — Christopher Boswell
(74) *Attorney, Agent, or Firm* — Brian S. Steinberger; Law Offices of Brian S. Steinberger, P.A

(57) ABSTRACT

Locks, lock mechanisms, lock assemblies, retro fit kits, and methods of using locks with cables and chains inside of strengthened flexible sleeves can conform to shape surfaces to which they are mounted, for preventing thefts of bicycles, motorcycles and other applications, such as but not limited to securing gates and doors, and other objects together. The flexible sleeve can include a series of ball and socket segments arranged next to one another, having a hollow conduit through which the cable or chain can pass through.

7 Claims, 15 Drawing Sheets

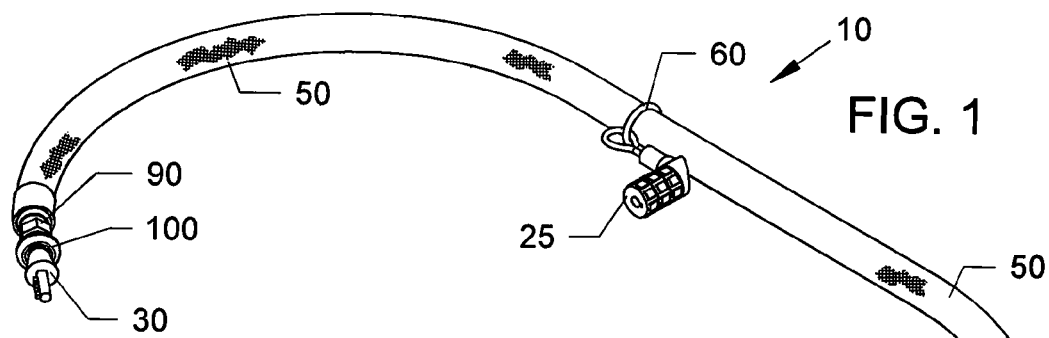
FIG. 1
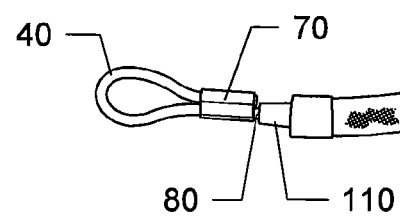
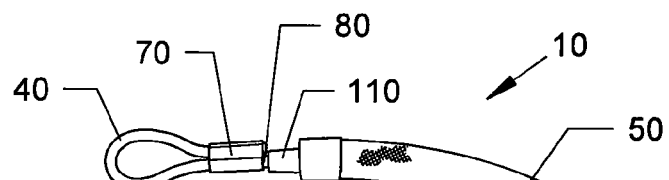
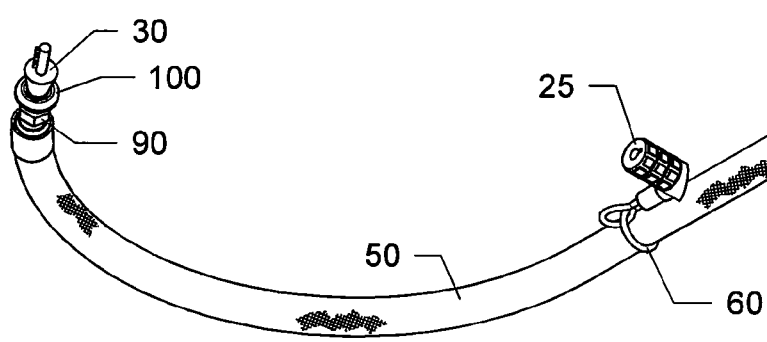
FIG. 2

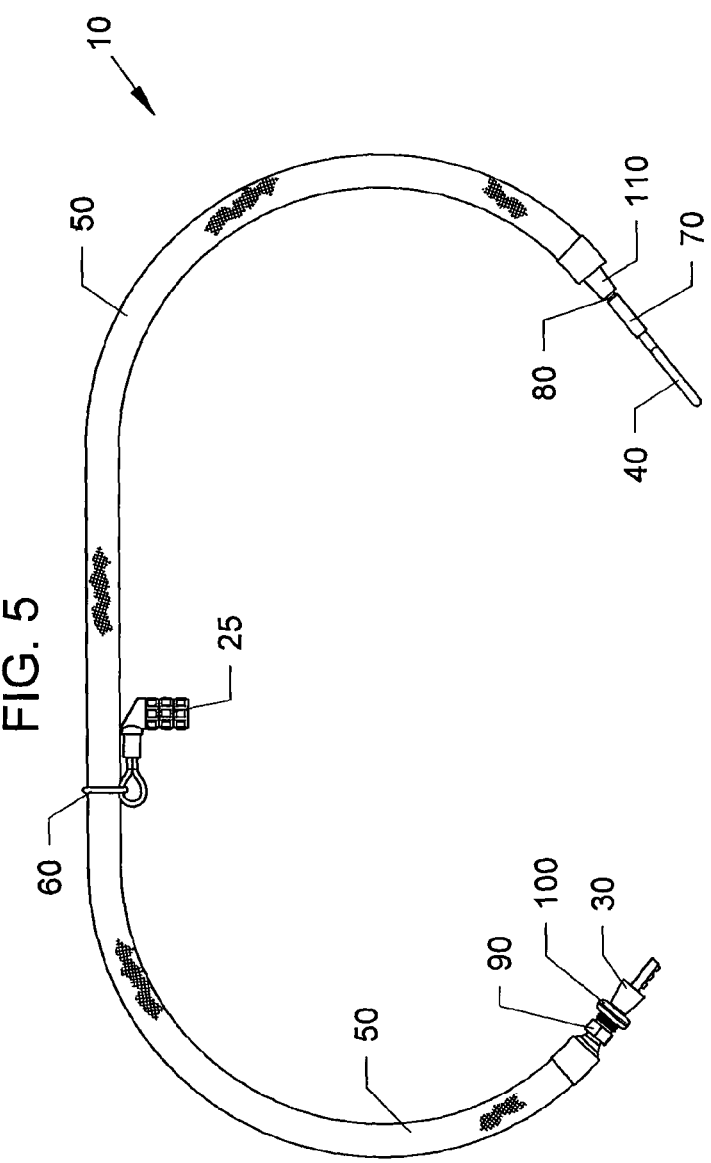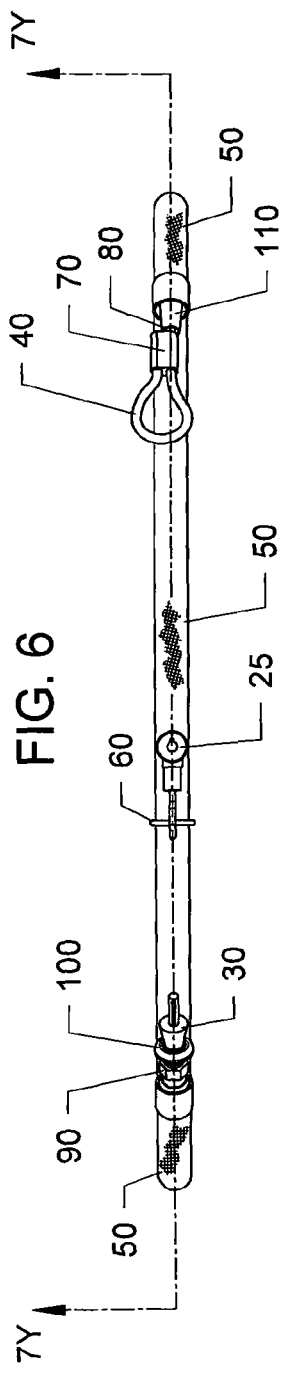

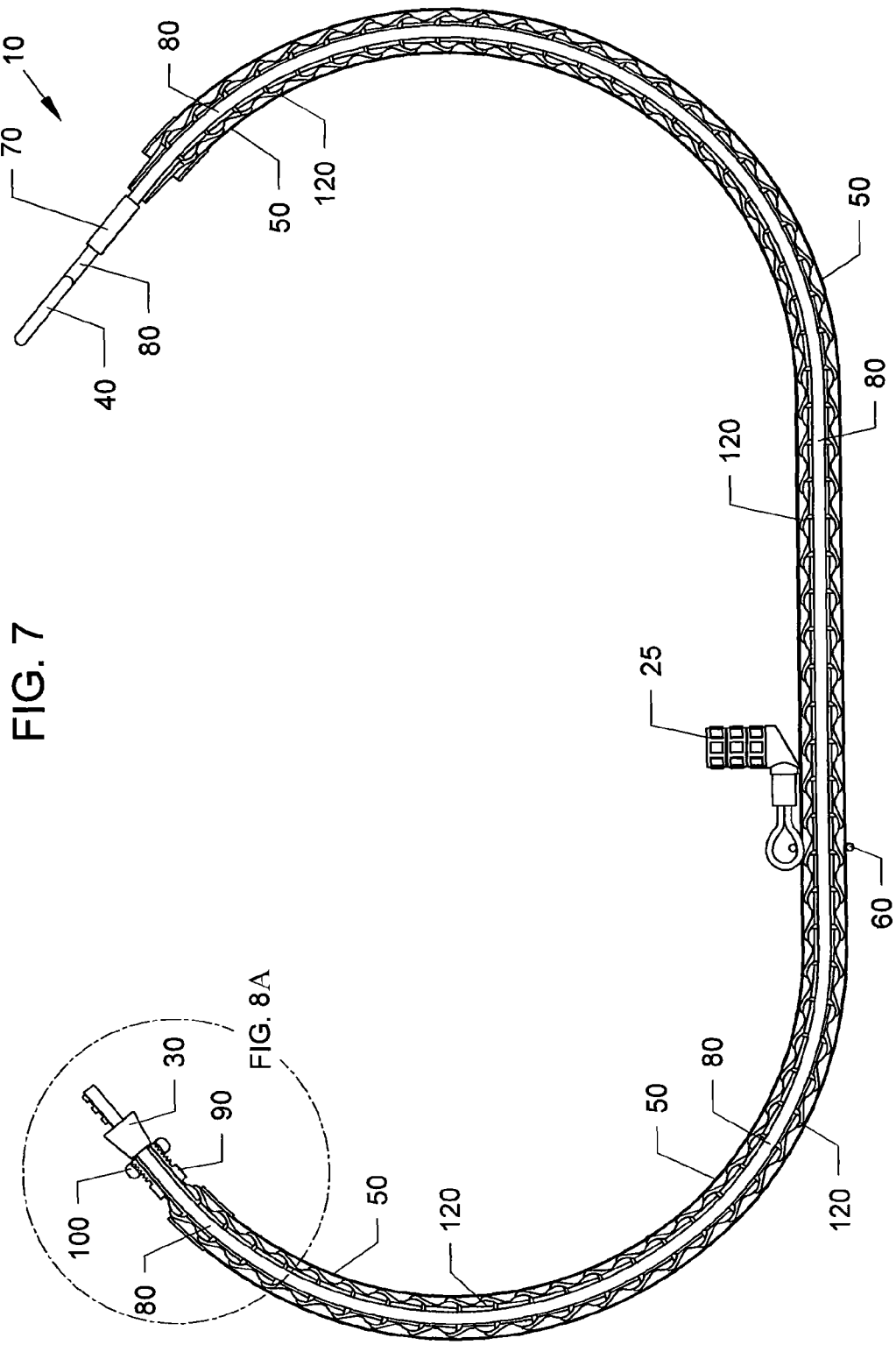

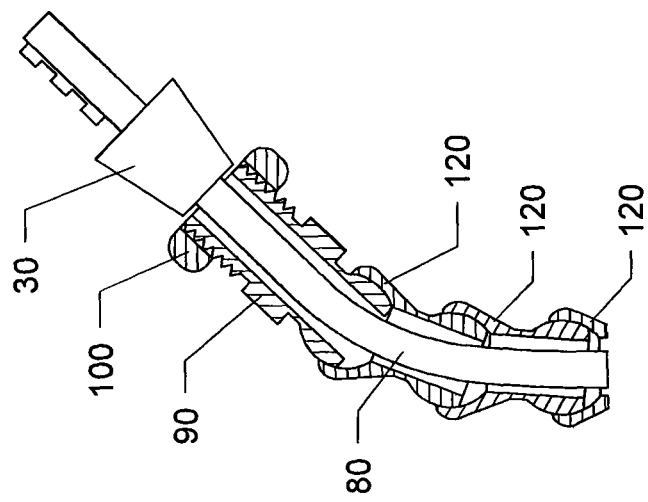
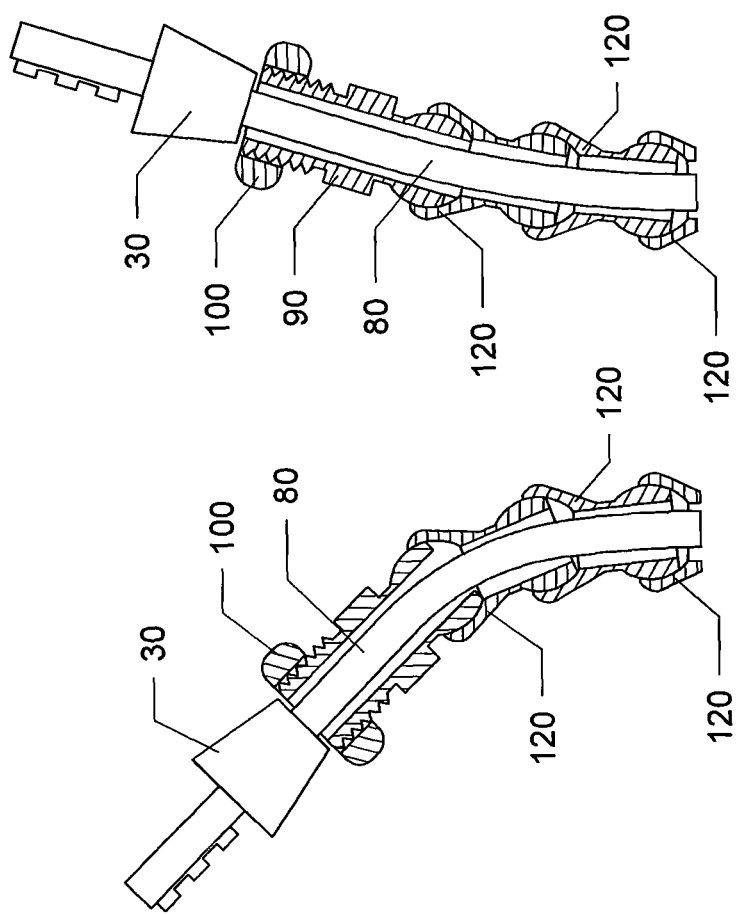
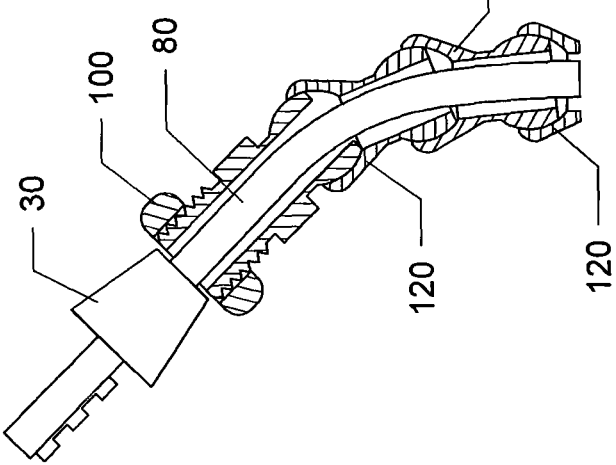

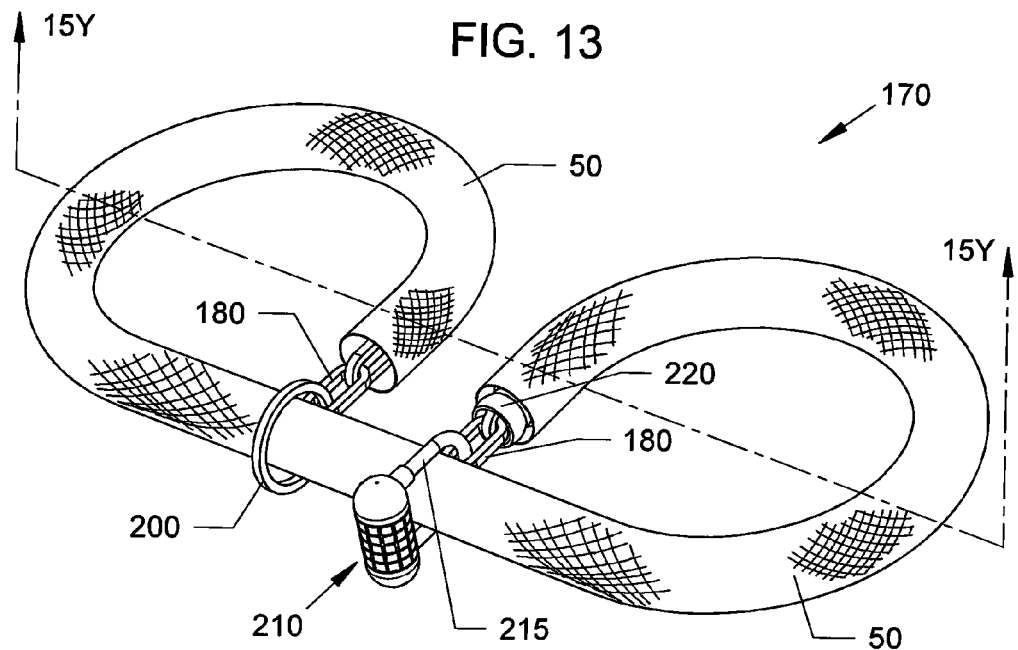
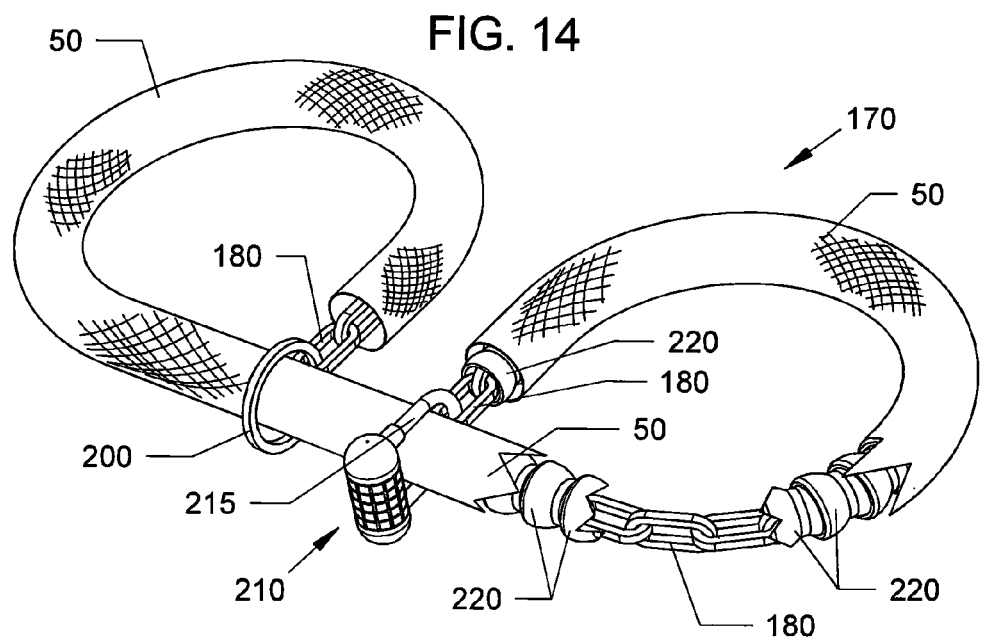

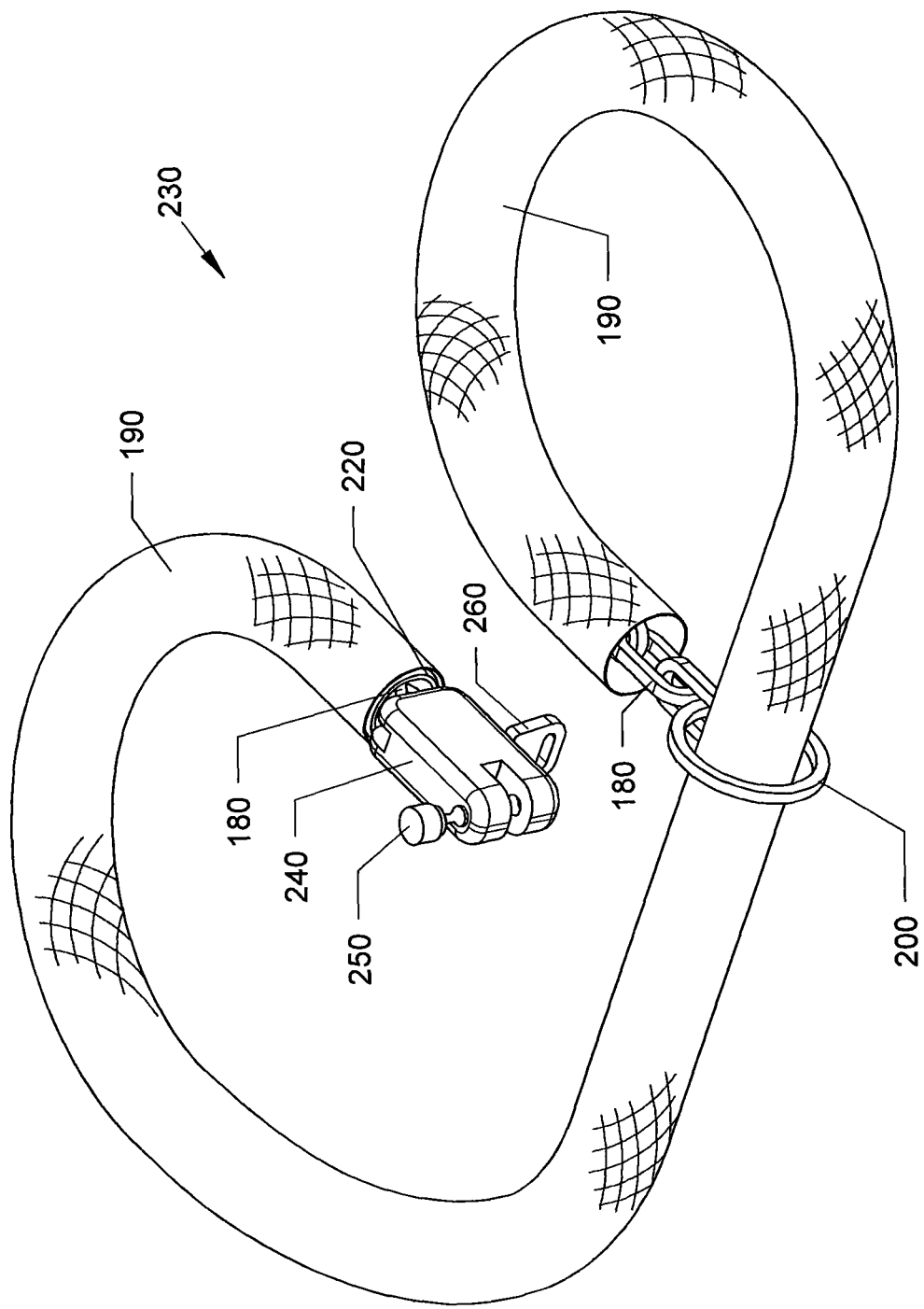

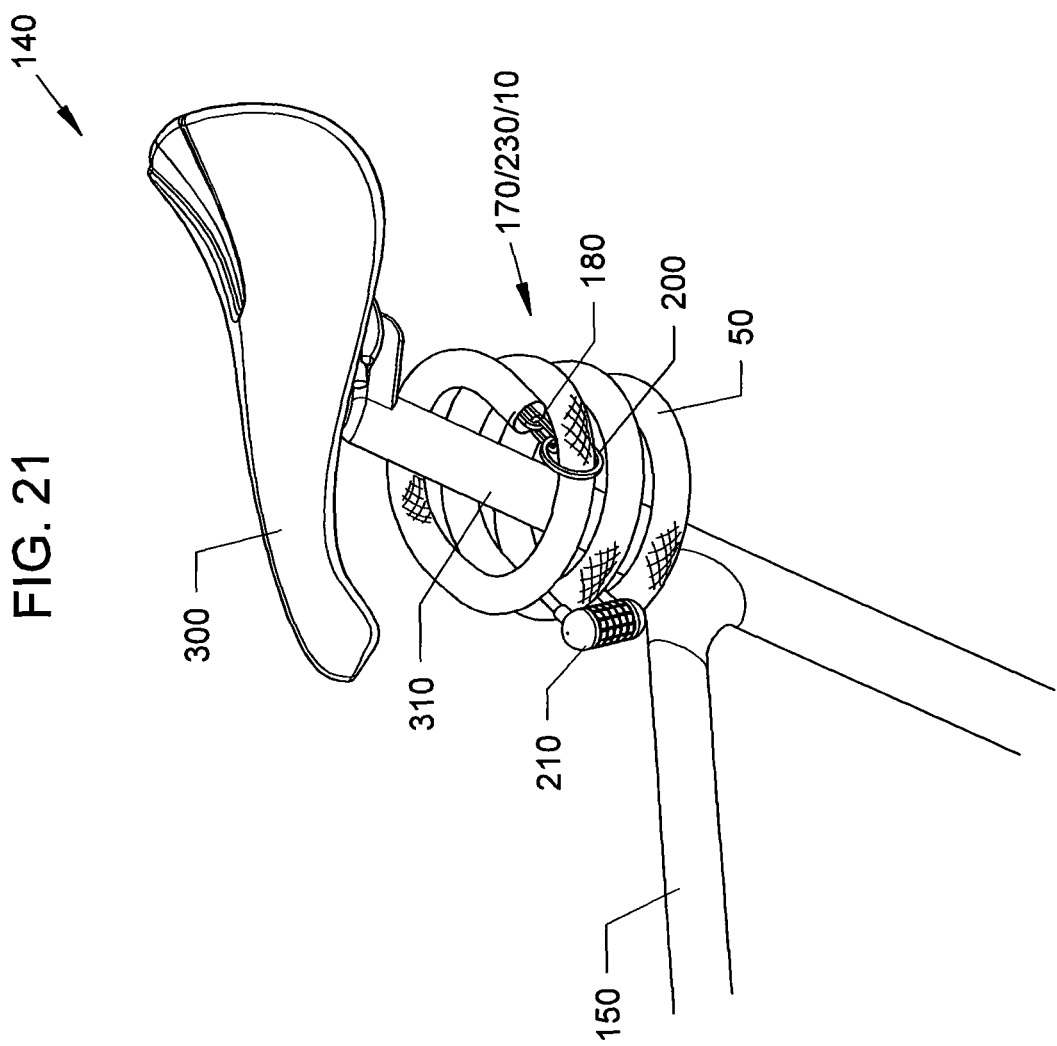

BICYCLE LOCK

FIELD OF INVENTION

This invention relates to locks, and in particular to locks, lock mechanisms, lock assemblies, retro fit kits, and methods of using locks with cables and chains inside of strengthened flexible sleeves of ball and socket segments that can conform to shape surfaces to which they are mounted, for preventing thefts of bicycles, motorcycles and other applications, such as but not limited to securing gates and doors, and other objects together.

BACKGROUND AND PRIOR ART

Cables and chains have been popular for locking bicycles and the like, to posts, etc. However, cables and chains have inherent problems. For example, when not being used as a lock the loose cables and chains can bang against the bike frame and cause scratches and damage to the bike. The loose cables and chains can also get tangled with the rider's legs, and can interfere with the wheels and pedals. Wrapping the chain can also be difficult since the wrapped chain can also move causing undesirable sound effects while it bangs about while the bicycle is being ridden.

Many cables and chains can also be cut open which defeats their purpose of securing the bicycle. Having thicker and larger cables and chains may be less prone to being cut, but their added weight can make them undesirable since riders do not want to add unnecessary weight on the bike, Other types of bicycle locks have become popular such as U-shaped locks, which includes the KRYPTONITE® lock. However, these locks can also tend to bang around if attached to seat post or about a bike frame when not being used. To keep the U shaped lock stationary, special brackets must be attached to the bicycle frame, which adds extra undesirable weight. Additionally, the U shaped locks have a fixed position U shape which makes then difficult for attaching the lock to both a bicycle and a support member that is not closely located to the bicycle.

Thus, the need exists for solutions to the above problems with the prior art.

SUMMARY OF THE INVENTION

A primary objective of the present invention is to provide locks, lock mechanisms, lock assemblies, and methods of using locks with cables and chains inside of strengthened flexible sleeves can conform to shape surfaces to which they are mounted, for preventing thefts of bicycles, motorcycles.

A secondary objective of the present invention is to provide locks, lock mechanisms, lock assemblies, and methods of using locks with cables and chains inside of strengthened flexible sleeves can conform to shape surfaces to which they are mounted, for securing gates and doors, and plural components together.

A third objective of the present invention is to provide locks, lock mechanisms, lock assemblies, and methods of using locks with cables and chains, that are as strong as larger diameter cables and chains, without having to increase the diameter of the existing cables and chains.

A fourth objective of the present invention is to provide locks, lock mechanisms, lock assemblies, and methods of using locks with cables and chains, that will not cause damage, to the surfaces upon which they are attached to.

A fifth objective of the present invention is to provide locks, lock mechanisms, lock assemblies, and methods of using locks with cables and chains, that can be retrofitted into stronger locks and chains that are can conform about surface shapes to which they are mounted.

An embodiment of a conformable lock assembly can include an elongated flexible member having a first end and a second end, a flexible hose having a bendable sleeve exterior which conforms about surfaces to which it is bent, the hose having a first end and a second end with conduit running therebetween, the elongated flexible member in the conduit with first end of the flexible member exposed from the first end of the flexible hose, and the second end of the flexible member exposed from the second end of the flexible hose, an outer protective cover for wrapping about the flexible conformable hose sleeve, and a lock mechanism for securing the first end and the second end of the flexible member in a loop configuration.

The elongated flexible member can include a cable having metal strands with a waterproof coating about the cable. The first end of the elongated cable can include a loop, and the second end of the elongated cable can include a first portion of the lock mechanism, and a second portion of the lock mechanism can include a second loop, wherein the first portion of the lock mechanism mateably locks with the second portion of the lock mechanism.

The first portion and the second portion can include a male member which interlocks into a female socket.

The flexible hose can include a series of ball and socket segments arranged next to one another.

The outer cover can include a mesh type cover.

The lock mechanism can secure the conformable lock into two separate loops.

The elongated flexible member can include a chain having a plurality of links.

The first end of the elongated chain can include a loop, and the second end of the elongated cable includes a first portion of the lock mechanism which mateably locks with the second portion of the lock mechanism.

The lock mechanism can include a horseshoe lock.

The lock mechanism can include a bolt lock.

Another version can include a retrofit lock assembly that can include a flexible hose having a series of ball and socket segments arranged next to one another with a conduit running through a middle portion of the hose, the hose having a first end and a second end, the hose being bendable to conform to different bent positions, and a protective sleeve covering around the flexible hose, wherein an elongated locking member having a first end and a second end is adaptable to be inserted into the flexible hose, so that the first end of the locking member is exposed from the first end of the flexible hose, and the second end of the locking member can be exposed from the second end of the flexible hose, wherein the elongated locking member is selected from a cable and a chain. The protective sleeve can include a mesh type cover.

A method of converting flexible elongated locks into strengthened conformable locks, can include the steps of providing a flexible elongated lock having a first end and a second end, the flexible elongated lock selected from a chain and a cable, providing a flexible conformable bendable sleeve having a hollow conduit therethrough, the sleeve having a first end and a second end, and sliding a first end of the flexible elongated lock into the second end of the hollow sleeve and pushing the first end until it extends from the first end of the hollow sleeve, and the second end of the flexible elongated lock extends from the second end of the hollow sleeve.

The step of providing a flexible elongated lock can include the step of providing a chain as the flexible elongated lock.

The step of providing a flexible elongated lock can include the step of providing a cable as the flexible elongated lock.

The step of providing the flexible conformable sleeve can include the step of providing a series of ball and socket segments arranged next to one another with the hollow conduit as the flexible conformable sleeve.

Further objects and advantages of this invention will be apparent from the following detailed description of the presently preferred embodiments which are illustrated schematically in the accompanying drawings.

BRIEF DESCRIPTION OF THE FIGURES

FIG. 1 is a top perspective view of a first embodiment of a conformable lock with cable inside of a flex hose with outer mesh cover in an unlocked position.

FIG. 2 is a bottom perspective view of the conformable lock with cable of FIG. 1.

FIG. 5 is a top view of the conformable lock with cable inside of FIG. 1.

FIG. 6 is a front view of the conformable lock with cable of FIG. 5.

FIG. 7 is a cross-sectional view of the conformable lock with cable of FIG. 6 along arrows 7Y.

FIG. 8A is an enlarged view of the male post end of the conformable lock with cable of FIG. 7 bent in a left direction.

FIG. 8B is another view of the male post end of the conformable lock with cable of FIG. 8A bent generally straight.

FIG. 8C is another view of the male post end of the conformable lock with cable of FIG. 8A bent in a right direction.

FIG. 13 is a perspective view of a second embodiment of a conformable lock with chain inside of a flex hose and mesh cover with horseshoe lock mechanism in locked position.

FIG. 14 is another view of the second embodiment of the FIG. 13 conformable lock with partial ghost view of the chain inside of a flex hose with mesh cover.

FIG. 20 is another perspective view of the conformable lock with chain of FIG. 17 with the bolt lock mechanism in an unlocked position.

FIG. 21 is a perspective view of one of the conformable locks of the preceding figures wrapped about a seat post of a bicycle when it is not being used.

DESCRIPTION OF THE PREFERRED EMBODIMENTS

Figure 3:
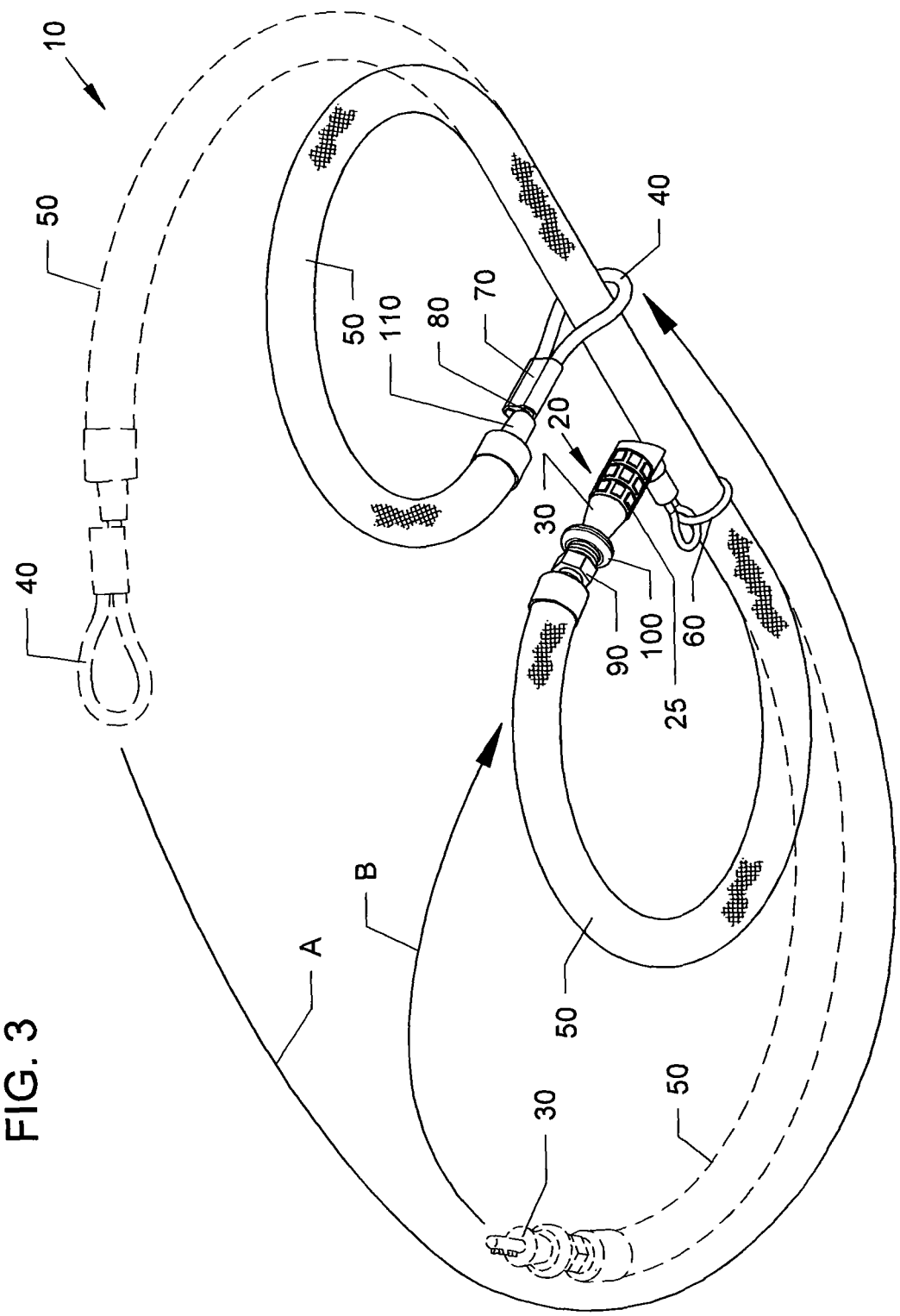
FIG. 3 is a bottom perspective view of the conformable lock with cable of FIG. 1 in a locked position and in dashed lines in an unlocked position.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

10 Cable style bike lock with small flexible segment protective cover.
20 Combination lock assembly with separate barrel and post
25 Female lock barrel
30 Male lock post
40 Cable loop.
50 protective cover, such as Poly fabric mesh tube cover
60 Small steel locking ring.
70 Cable crimp sleeve
80 Wire cable with plastic cover
90 Small flex hose segment with threaded tube
100 Rubber grommet
110 Small flex hose finishing segment
120 Small flex hose segment
130 Fixed utility pole
140 Bicycle
150 Bicycle frame
160 Bicycle wheel
170 Chain style bike lock with horse shoe style lock and larger flexible segment protective cover.
180 Chain.
190 Open weave poly fabric mesh
200 Large steel locking ring.
210 Horse shoe style combination lock
215 Locking ring for horse shoe style lock
220 Large flex hose segment
230 Chain style bike lock with bolt style lock and larger flexible segment protective cover.
240 Bolt style lock
250 Sliding lock bolt
260 Key for bolt lock.

300 bike seat
310 seat post

First Embodiment

FIG. 1 is a top perspective view of a first embodiment of a conformable lock 10 with cable 80 inside of a flex hose with outer mesh cover 50 in an unlocked position. FIG. 2 is a bottom perspective view of the conformable lock 10 with cable 80 of FIG. 1. FIG. 3 is a bottom perspective view of the conformable lock 10 with cable 80 of FIG. 1 in a locked position and in dashed lines in an unlocked position.

Figure 4:
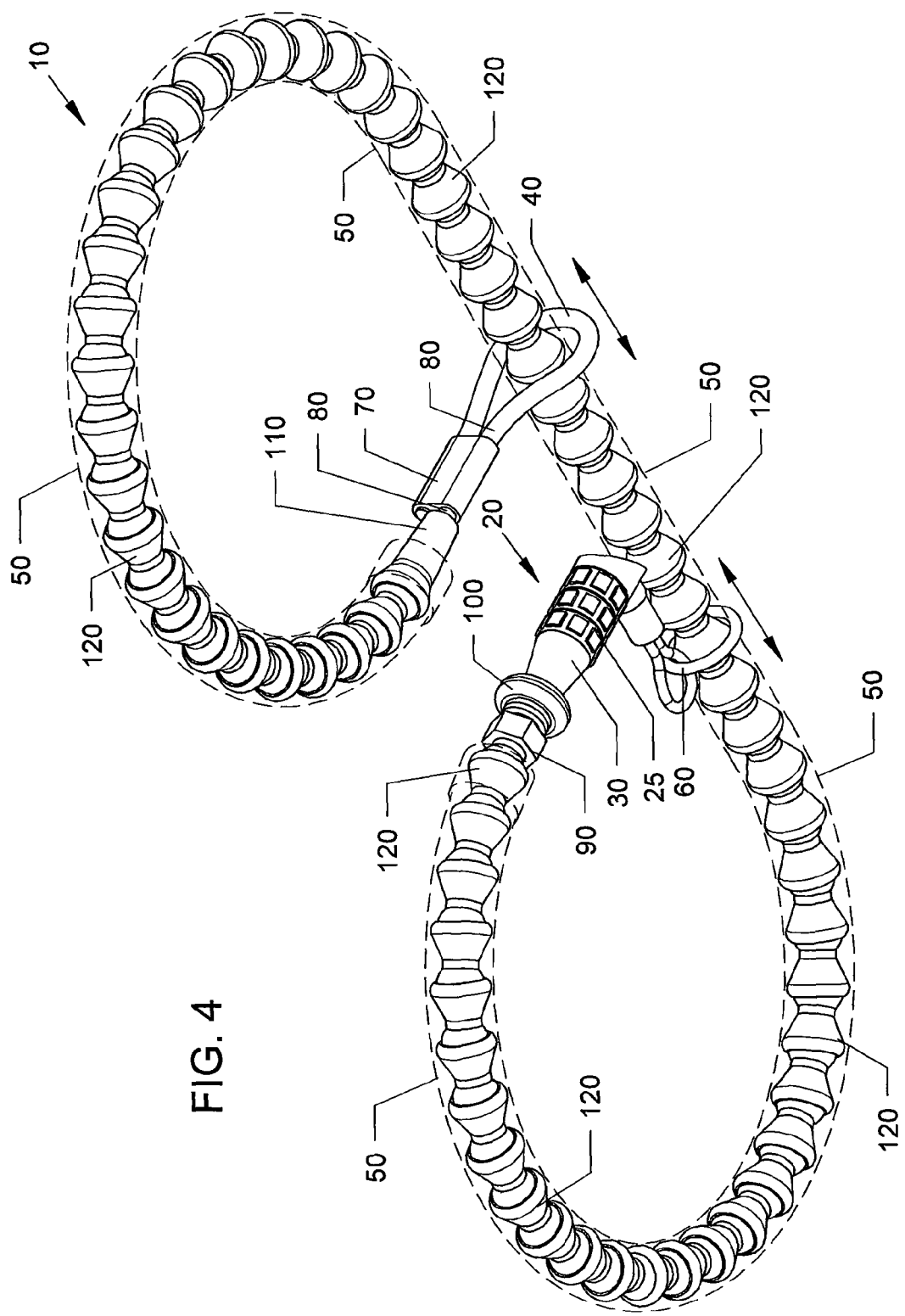
FIG. 4 is another perspective view of the conformable lock with cable of FIG. 3 with outer mesh cover removed.

FIG. 4 is another perspective view of the conformable lock 10 with cable 80 of FIG. 3 with outer mesh cover 50 removed.

FIG. 5 is a top view of the conformable lock 10 with cable 80 inside of FIG. 1 with outer mesh cover 50. FIG. 6 is a front view of the conformable lock 10 with cable 80 of FIG. 5.

FIG. 7 is a cross-sectional view of the conformable lock 10 with cable 80 of FIG. 6 along arrows 7Y. FIG. 8A is an enlarged view of the male post end 30 of the conformable lock 10 with cable 80 of FIG. 7 bent in a left direction. FIG. 8B is another view of the male post end 30 of the conformable lock 10 with cable 80 of FIG. 8A bent generally straight. FIG. 8C is another view of the male post end 30 of the conformable lock 10 with cable 80 of FIG. 8A bent in a right direction.

Referring to FIGS. 1-8C, conformable lock 10 can include an elongated flexible cable 80 having a first end with a male post end 30, and an opposite end of the cable 80 being formed into a loop 40, formed by a cable type crimp sleeve 70. Cable 80 can be a basic type cable having elongated metal strands with a plastic outer coating, such as those used for bike locks, and the like, such as but not limited to the cable shown and described in U.S. Pat. No. 3,590,608 to Smyth, U.S. Pat. No. 4,597,273 to Reichenberger; U.S. Pat. No. 5,937,678 to Kuo; and U.S. Pat. No. 6,401,502 to Yang, which are all incorporated by reference in their entirety.

The cable 80 can be placed along an axial hollow conduit inside of a flexible and conformable hose sleeve having a series of individual ball and socket segments 120, arranged next to one another that forms a flexible goose neck which can bend and hold its' bent configuration. Segments 120 can be arranged as vertebra components containing individual ball and socket plastic, such as polycarbonate components that form a flexible gooseneck. Such as gooseneck structure is shown and described in FIGS. 11, 15 and paragraphs 15-16 of U.S. Published Patent Application 2014/0024247 to Riesgaard et al., which is incorporated by reference in its' entirety. The series of segments 120 forms a thickened outer shell that further provides a lock that is more difficult to cut and break than merely using a cable by itself.

As shown in FIGS. 8a-8c, bending the series of ball and socket segments 120, function similar to a gooseneck, where the bend is held in place.

One end of the series of individual ball and socket segments 120 can include a small flex hose segment 90 having an exterior protruding exterior threaded tube, with an enlarged grommet 100, such as but not limited to a rubber type grommet, and the like, about the threaded tube, with the male lock post 30 protruding therefrom. The opposite end of the flexible and conformable sleeve of a series of individual ball and socket segments 120 can include a small flex hose finishing segment 110, from which the loop end 40 of the cable 80 protrudes with the cable crimp sleeve 70.

Surrounding the series of segments 120 can be a protective tube 50, such as but not limited to a poly fabric mesh tube.

Positioned along a mid-portion outside of the protective tube 50 can be a locking ring 60, such as a metal or steel locking ring, that can be attached to a lock barrel 25 having a female socket. The lock barrel 25 with female socket, can mateably receive the male lock post 30, and together form a combination lock 20.

As shown in FIGS. 1-4, the loop end 40 of the cable 80 can be slipped over the open male post end 30, to form a larger first right loop. The male post end 30 can be fit into the female socket in the lock barrel 25 to form a large left loop.

Figure 9:
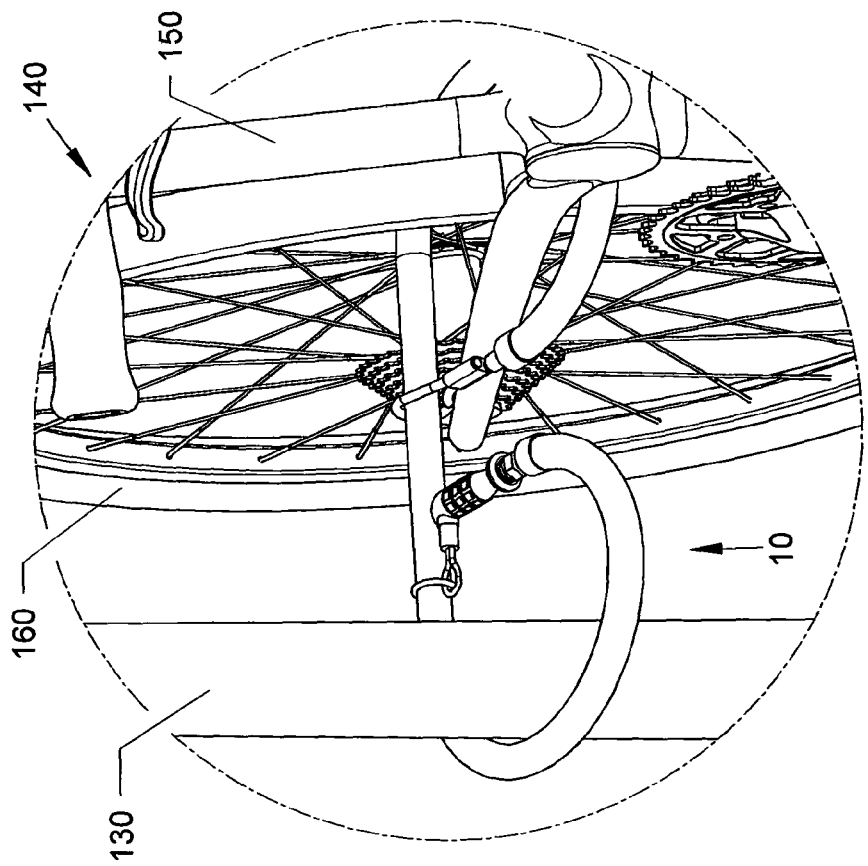
FIG. 9 is a perspective view of the conformable lock of FIG. 1, locking a bicycle to a post.
Figure 10:
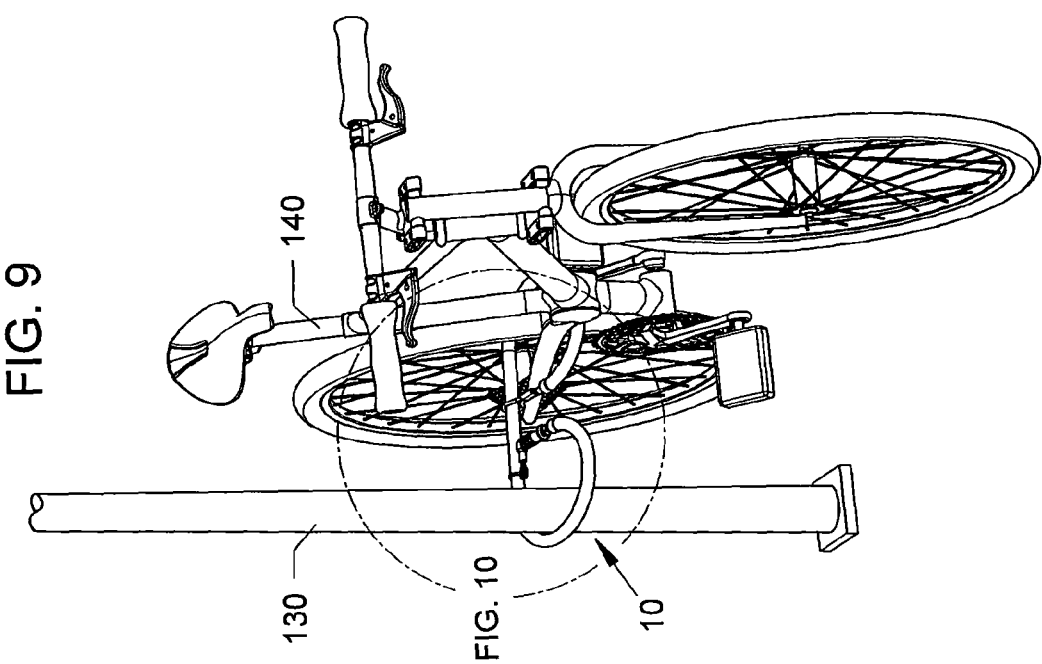
FIG. 10 is an enlarged view of the conformable lock locking the bicycle to the post of FIG. 9.

FIG. 9 is a perspective view of the conformable lock 10 with right and left loop configurations of FIGS. 1-4, locking a bicycle 140 to a fixed post 130. FIG. 10 is an enlarged view of the conformable lock 10 locking the bicycle wheel 160 and the bicycle frame 150 to the fixed post 130 of FIG. 9.

Figure 11:
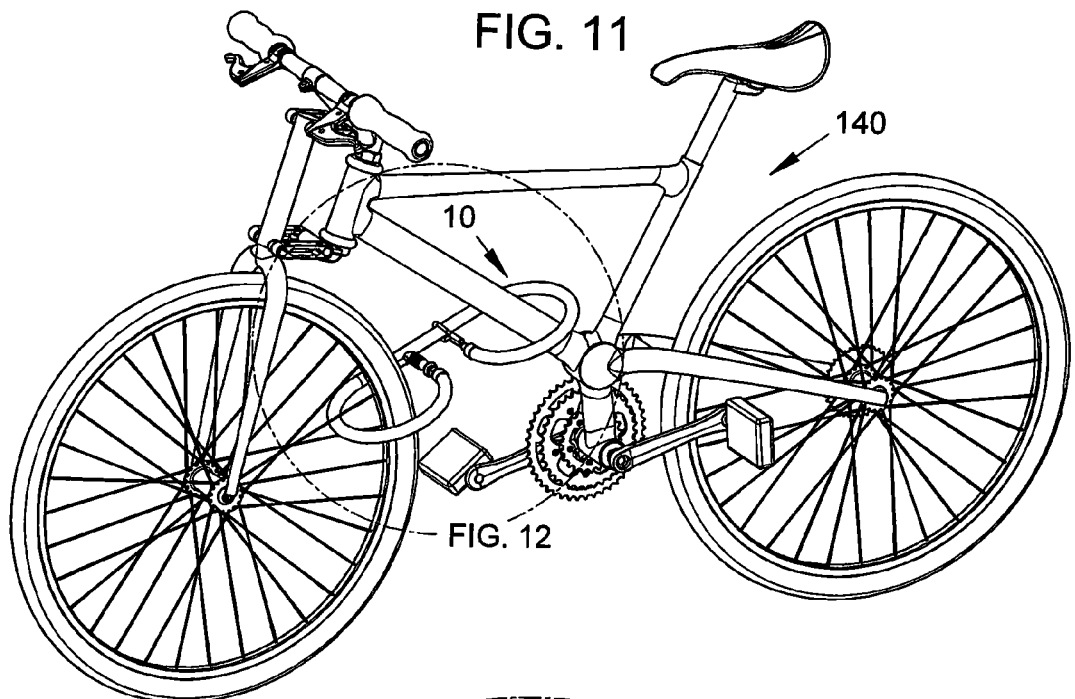
FIG. 11 is a perspective view of the conformable lock of FIG. 1, locking a bicycle wheel to the bicycle frame.
Figure 12:
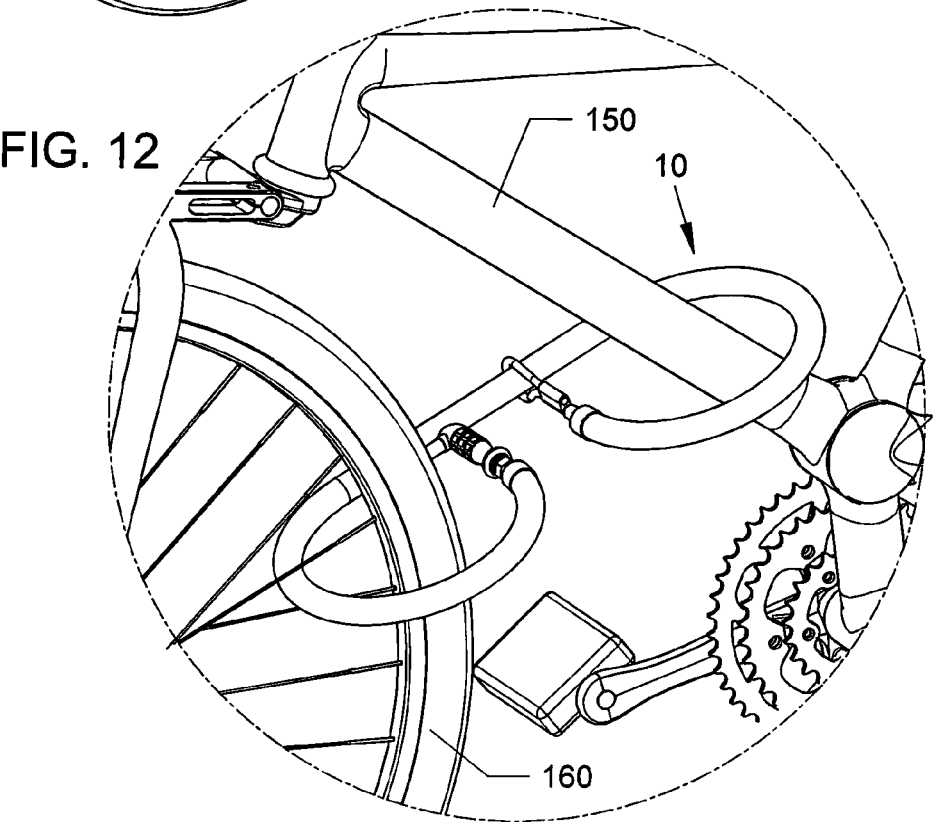
FIG. 12 is an enlarged view of the conformable lock locking the bicycle wheel to the bicycle frame of FIG. 11.

FIG. 11 is a perspective view of the conformable lock 10 with right and left loop configurations of FIGS. 1-4, locking a bicycle wheel 160 to the bicycle frame 150. FIG. 12 is an enlarged view of the conformable lock 10 locking the bicycle wheel 160 to the bicycle frame 150 of FIG. 11.

A slim diameter versions with a low weight of a preferred embodiment of the cable version inside of the conformable flexible hose type housing can include a cable having an approximately 3/16' diameter inside of a channel in a flexible hose housing (of a series of ball and socket segments). The channel can have an inner diameter of approximately 1/4", and an outer diameter of the flexible hose housing with a cover, such as a mesh type cover can have an outer diameter of approximately 1/2 ". This assembly with a lock mechanism can have a weight of approximately 9.8 ounces, and length of approximately 31 inches. Other sizes and weights can be larger and have more weight. The term approximately can include a variation of +/−10 percent of the numerical value.

Second Embodiment

FIG. 13 is a perspective view of a second embodiment of a conformable lock 170 with chain 180 inside of the conformable flex hose formed from a series of adjacent ball and socket segments 220 and protective cover 50 (such as a mesh cover) with horseshoe lock mechanism 210 in locked position. FIG. 14 is another view of the second embodiment of the FIG. 13 conformable lock 170 with partial ghost view of the chain 180 inside of a flex hose of the series of ball and socket segments 220 with protective cover 50.

Figure 15:
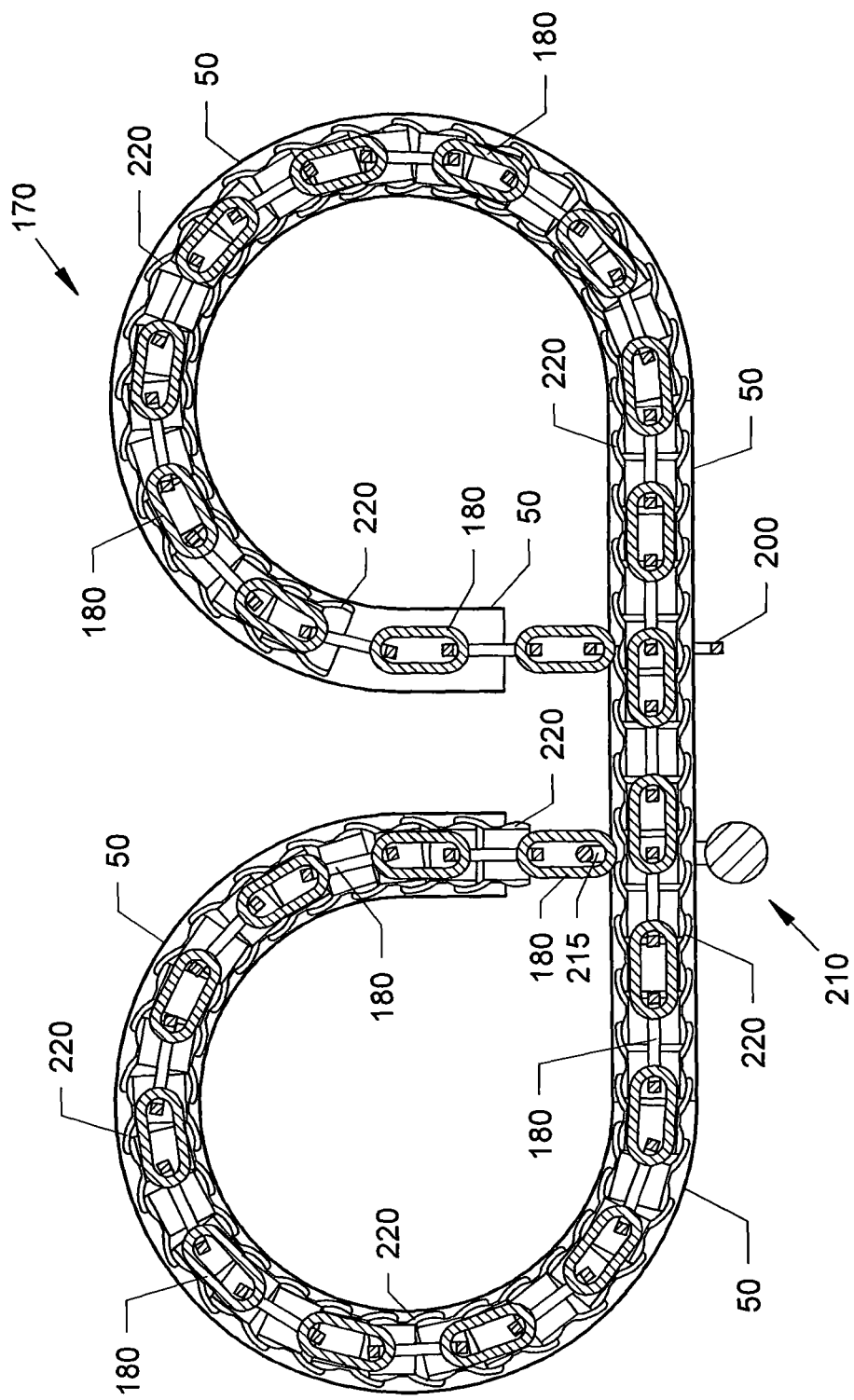
FIG. 15 is a cross-sectional view of the conformable lock with chain of FIG. 13 along arrows 15Y.
Figure 16:
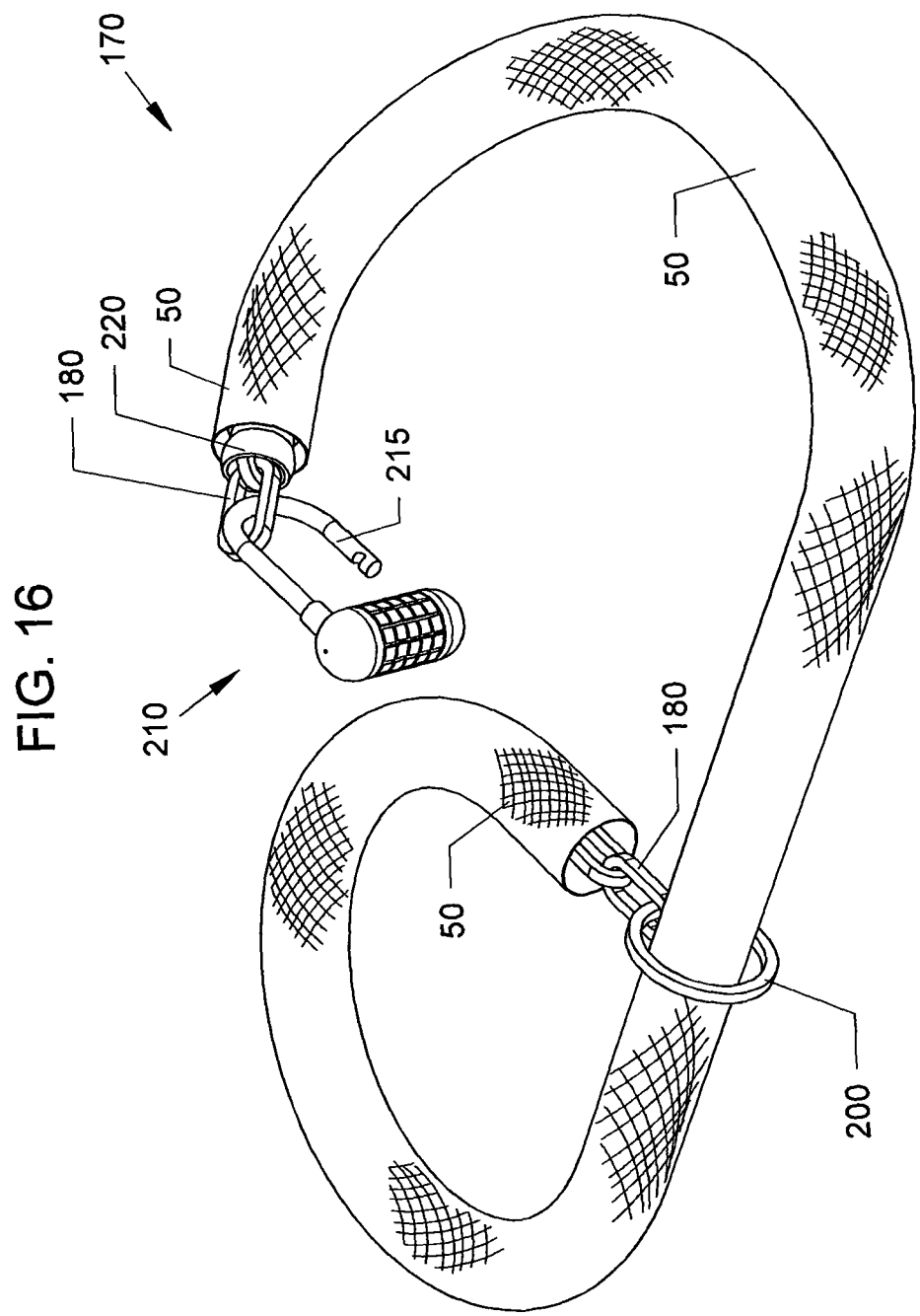
FIG. 16 is another perspective view of the conformable lock with chain of FIG. 13 with horseshoe lock mechanism in an unlocked position.

FIG. 15 is a cross-sectional view of the conformable lock 170 with chain 180 of FIG. 13 along arrows 15Y. FIG. 16 is another perspective view of the conformable lock 170 with chain 180 of FIG. 13 with horseshoe lock mechanism 210 in an unlocked position.

Referring to FIGS. 13-16, the conformable lock 170 can include a series of ball and socket segments 220, similar, to the series of segments 120 described in the previous embodiment, with the difference being the interior hollow axial conduit can have a larger diameter, in order to allow for links of a chain 180, to be passed therethrough. Chain 180 can be formed from metal links, and/or hardened plastic links, and the like. Surrounding the series of segments 220 can be a protective cover 50, such as a mesh cover that was described above.

Attached to one outer link of the chain 180 can be a large ring 200, such as a large diameter steel locking ring, and the like. Attached to the opposite link of the chain 180 can be the locking ring 215 on a horseshoe combination type lock 210. The right and left large loop configurations shown in FIGS. 13-16 can secure a bicycle 140 to a post 130, with the bicycle wheel 150 and bicycle frame 160 in a manner similar to the previous embodiment shown in FIGS. 9-12.

Third Embodiment

Figure 17:
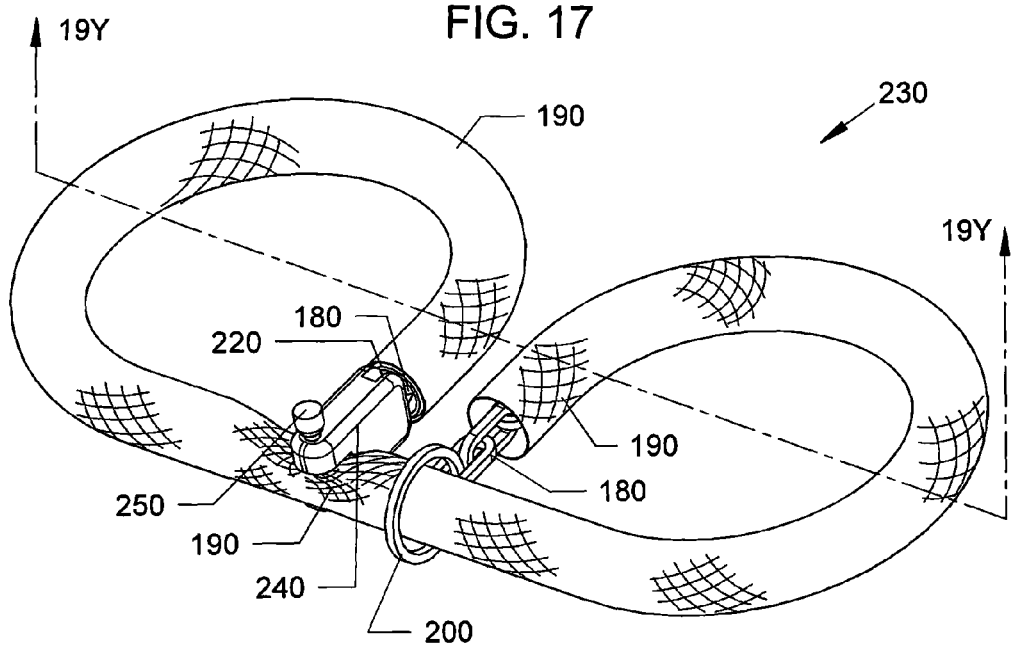
FIG. 17 is a perspective view of a third embodiment of the conformable lock with chain inside of flex hose and mesh cover with bolt lock mechanism locked.
Figure 18:
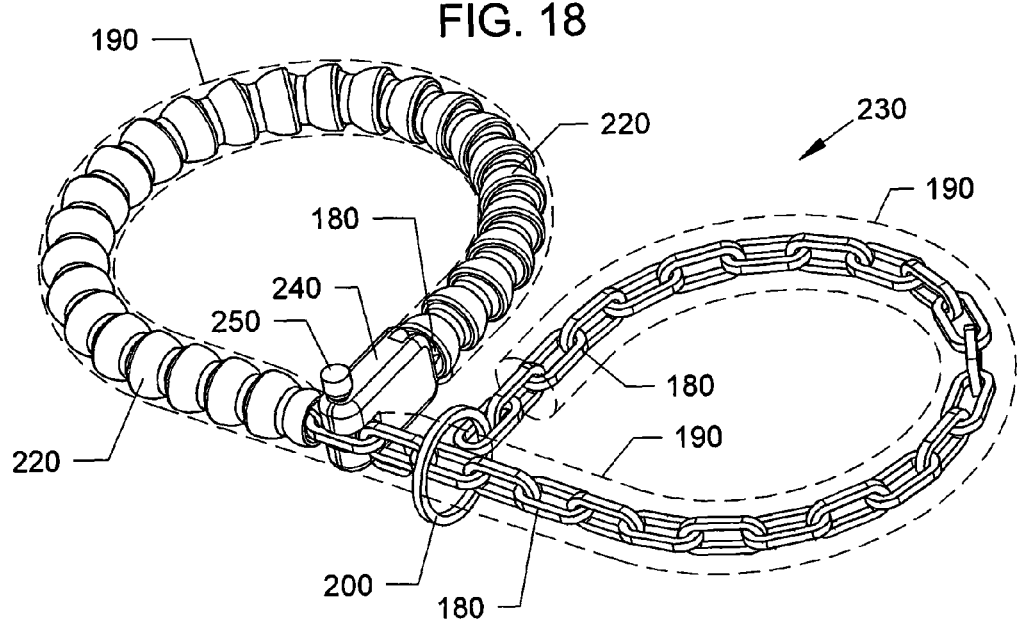
FIG. 18 is another perspective view of the conformable lock of FIG. 17 with outer mesh cover removed on one side and both the mesh cover and flex hose removed from the other side.
Figure 19:
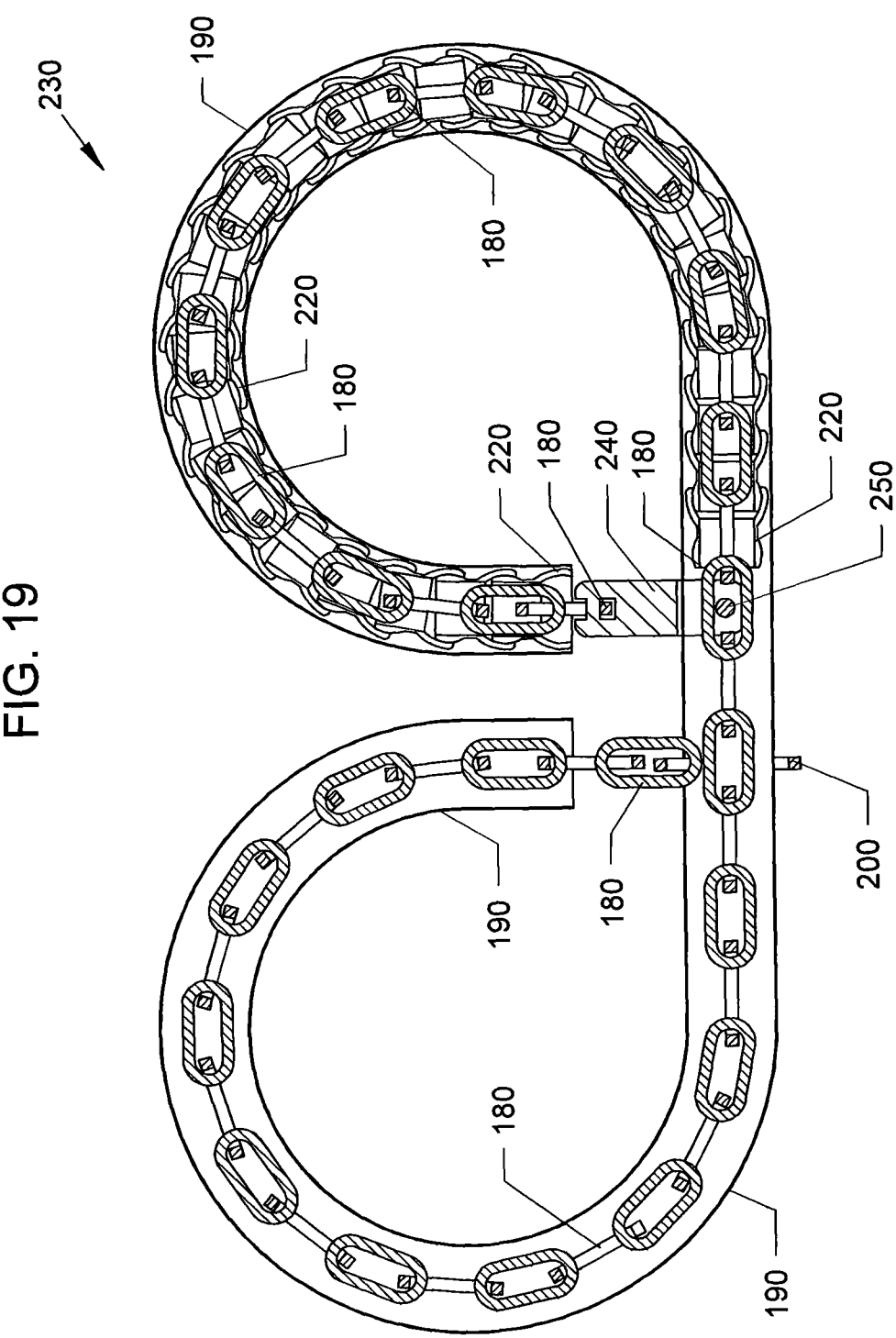
FIG. 19 is a cross-sectional view of the conformable lock with chain of FIG. 17 along arrows 19Y.

FIG. 17 is a perspective view of a third embodiment of the conformable lock 230 with a chain 180 inside of flex hose series of ball and socket segments 220, and a protective mesh cover 190 with bolt lock mechanism locked. The protective cover 190 can be an open weave poly fabric mesh cover. FIG. 18 is another perspective view of the conformable lock 230 of FIG. 17 with outer protective cover 190 removed on one side and both the protective cover 190 and flex hose of series of segments 220 removed from the other side. FIG. 19 is a cross-sectional view of the conformable lock 230 with chain 180 of FIG. 17 along arrows 19Y. FIG. 20 is another perspective view of the conformable lock 230 with chain 180 of FIG. 17 with the bolt lock mechanism 240 in an unlocked position.

Referring to FIGS. 17-20, the conformable lock 230 can use bolt style lock 240, having a sliding lock bolt 250 that slides up and down, and key 260 for opening and closing the bolt style lock 240. In this embodiment, the flex hose series of ball and socket segments 220 can be covering only about half of the links in the chain 180. Here, the sliding lock bolt 250 can create a large left side loop by passing into a selected link in the chain 180 to selectively make the left loop larger or smaller as desired. The right and left large loop configurations shown in FIGS. 17-20 can secure a bicycle 140 to a post 130, with the bicycle wheel 150 and bicycle frame 160 in a manner similar to the previous embodiment shown in FIGS. 9-12.

FIG. 21 is a perspective view of one of the conformable locks 170/230/10 of the preceding figures wrapped about a post 310 under a seat 300 of a bicycle 140 when it is not being used. The conformable lock(s) 170/230/10 can maintain a coil position and fit about the seat post 310, wherein the outer protective cover(s) 50/190 can protect the post 310, seat 300 and bicycle frame 150 from being damaged as occurs with using plain unprotected chains or cables of the prior art. The coil wrap of the conformable lock(s) 170/230/10 can also be tightened to not slip about the seat post 301 and/or about the bicycle frame 150, when not being used.

A preferred version of a chain in the conformable lock assembly with the chain inside of a channel in the series of ball and socket segments of the flexible hose housing can use a chain of approximately ⅜" diameter, with the inner diameter of the channel being approximately 1½" with the outer diameter of the flexible hose housing with mesh type cover being approximately 1⅞". The conformable lock assembly with chain and a lock mechanism can have an overall weight of approximately 1.9 pounds, and a length of approximately 44". Other sizes of smaller and larger diameter chains and different lengths of chains and flexible hose housings can be used. The term approximately can include a variation of +/−10 percent of the numerical value.

Retrofit Kits for Cables and Chains

Although the invention shows finished conformable locks with cables and chains, the invention can be used to retrofit an existing cable used as a lock, or an existing chain used as a lock, into a conformable lock inside a series of ball and socket segments. The invention can be made and sold in a kit form, with the hollowed out series of ball and socket segments, where the user can insert their own existing cable or chain into the hollowed out series of segments.

The invention can be used to retrofit an existing cable and chain lock into a conformable lock assembly, by inserting the cable or chain into the hollowed out channel within a series of ball and socket segments arranged next to one another that forms a flexible hose housing. One end of a cable with a loop end can be pushed or pulled into one open channel end and pulled out the opposite open end of the channel, by various techniques. For example the loop end of the cable can be pushed and fished through the open channel. Alternatively, a cord or line can be attached to the loop end of the cable and a free end of the cord/line can be passed through the channel to an opposite end, and the free end of the cord/line can be pulled out to fish the cable through the channel.

Similarly, an end link of a chain can be pushed or pulled through the channel in the series of ball and socket segments that form the flexible hose housing, so that the most of the chain is inside of the flexible hose housing and single link ends are exposed at the ends of the flexible hose housing. The retrofitting of the chain into the conformable housing can be done in a similar manner to retrofitting of the cable.

While the series of ball and socket segments with channel forming the conformable and pliable flexible hose housing is described as being made of plastic, such as a polycarbonate, other types of materials, such as but limited to other hard plastic type materials, can be used as well as other materials such as hardened rubber, and materials that can include metal, such as steel, and the like, can be used.

Although the embodiments show securing bicycles, the invention can be used for securing other objects, such as but not limited to locking motorcycles, securing gates and doors, and securing various other objects together.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A conformable lock assembly consisting of:
an elongated flexible metal cable having metal strands with a waterproof coating about a portion of the cable, the cable having a first end and a second end;
a flexible conformable hose consisting of a series of plastic segments having a bendable configuration which conforms about surfaces to bend where the bend is held in place, each of the plastic segments consisting of ball and sockets the hose having a first end and a second end with conduit running therebetween, with the elongated flexible metal cable running inside the conduit with first end of the flexible metal cable exposed from the first end of the flexible hose, and the second end of the flexible metal cable exposed from the second end of the flexible hose;
an outer protective cover for wrapping about the flexible conformable hose; and
a lock mechanism for securing the first end and the second end of the flexible member in at least one loop configuration.

2. The conformable lock assembly of claim 1, wherein the first end of the elongated metal cable includes a loop, and the second end of the elongated metal cable includes a first portion of the lock mechanism, and a second portion of the lock mechanism includes a second loop, wherein the first portion of the lock mechanism mateable locks with the second portion of the lock mechanism.

3. The conformable lock assembly of claim 1, wherein the outer cover includes: a mesh cover.

4. The conformable lock assembly of claim 1, wherein the lock mechanism includes: a horseshoe lock.

5. The conformable lock assembly of claim 1, wherein the lock mechanism includes: bolt lock.

6. A retrofit lock assembly, consisting of:
- a flexible hose consisting of a series of ball and socket plastic segments arranged next to one another with a conduit running through a middle portion of the hose, the hose having a first end and a second end, the hose being bendable to conform and stay in different bent positions; and
- a protective sleeve covering around the flexible hose;
- an elongated metal cable having metal strands with a waterproof coating about a portion of the cable, the running through the conduit, the metal cable having a first end and a second end;
- a locking member having a first end and a second end, the first end of the locking member being exposed from the first end of the flexible hose, and the second end of the locking member being exposed from the second end of the flexible hose, wherein the assembly forms at least one loop configuration when used as a lock.

7. The retrofit lock assembly of 6, wherein the protective sleeve includes:
a mesh cover.

\* \* \* \* \*

UNITED STATES PATENT AND TRADEMARK OFFICE
CERTIFICATE OF CORRECTION

| | | |
|---|---|---|
| PATENT NO. | : 9,243,428 B1 | Page 1 of 1 |
| APPLICATION NO. | : 14/569081 | |
| DATED | : January 26, 2016 | |
| INVENTOR(S) | : Darrell Miracle | |

It is certified that error appears in the above-identified patent and that said Letters Patent is hereby corrected as shown below:

Title Page, Item 72;
The inventor's address should read as follows:
113 La Riviere Road, Cocoa Beach, Florida 32931

Signed and Sealed this
Sixteenth Day of August, 2016

Michelle K. Lee
*Director of the United States Patent and Trademark Office*